J. T. MARTIN.
Ice-Breaker.
No. 166,793.  Patented Aug. 17, 1875.
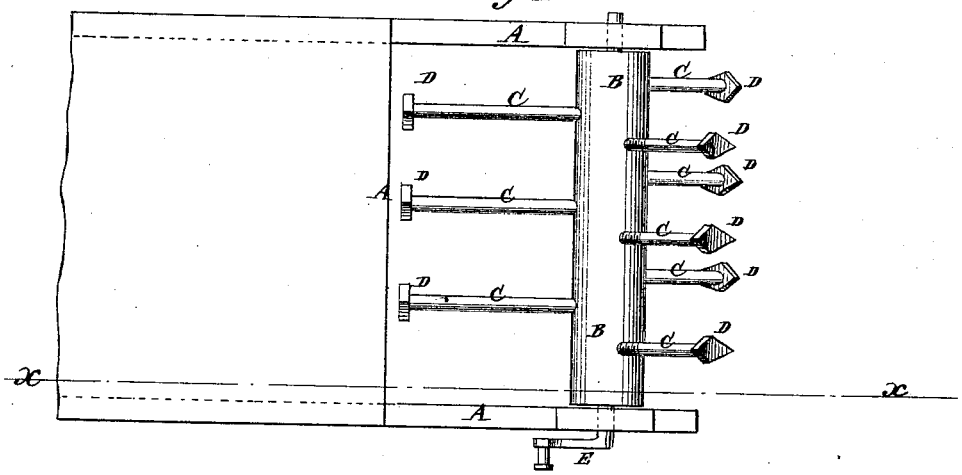
Fig. 1
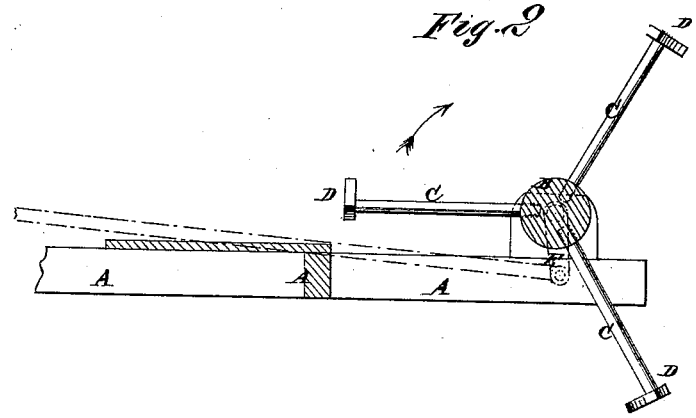
Fig. 2
Fig. 3
Fig. 4
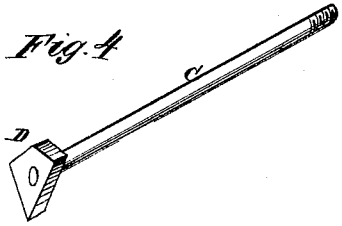
WITNESSES:
A. W. Almquist
A. F. Terry
INVENTOR:
Joseph T. Martin
BY Munn & Co.
ATTORNEYS.

UNITED STATES PATENT OFFICE.

JOSEPH T. MARTIN, OF NEWARK, NEW JERSEY.

IMPROVEMENT IN ICE-BREAKERS.

Specification forming part of Letters Patent No. 166,793, dated August 17, 1875; application filed July 17, 1875.

*To all whom it may concern:*

Be it known that I, JOSEPH T. MARTIN, of Newark, Essex county, New Jersey, have invented a new and useful Improvement in Ice-Breakers, of which the following is a specification:

Figure 1 is a top view of my improved ice-breaker. Fig. 2 is a vertical section of the same, taken through the line $x\ x$, Fig. 1. Fig. 3 is a plan view of one of the ax-heads, and Fig. 4 is a perspective view of the same.

Similar letters of reference indicate corresponding parts.

The object of this invention is to furnish an improved device for attachment to the bow of a boat, to enable the boat to break her way through the ice in her front as she passes through the water, to form a passage for herself through a harbor or river, and to enable her to keep a harbor or channel open.

The invention consists in the combination of the ax or wedge shaped heads, the radial arms, the shaft, and the frame with each other, as hereinafter described, to adapt the device for attachment to a boat, as set forth.

A represents a frame, which is designed to be securely attached to the bow of a boat, and to the outer part of the side beams of which is pivoted a shaft, B, to which are attached any desired number of radial arms, C.

The particular arrangement of the arms C is immaterial; but I prefer to arrange them in three rows, and alternately with respect to each other, or, in other words, to arrange them in three rows, and at the same time spirally, so that the succeeding axes may strike the ice successively.

Upon the outer ends of the arms C are formed heavy heads D, which are made with ax or wedge shaped forward sides, as shown in the drawings, so as to chop or cut the ice as they come in contact with it. To one end of the shaft B is attached a crank, E, to which the power is applied.

The ice-breaker may be driven from the engine that drives the boat, or it may be driven by an engine carried upon the boat for that express purpose.

The device is designed to be driven rapidly, so that the axes D may strike the ice in quick succession, and thus close to its edge, so as to break it more readily and break it in small pieces.

Having thus described my invention, I claim as new and desire to secure by Letters Patent—

The ice-breaker, substantially as shown and described, consisting of the shaft B, carrying the radial arms C, said arms being rigidly secured to said shaft, and provided at their outer ends with ax or wedge shaped heads D, the whole mounted in a suitable frame, adapted to be secured to a vessel, in the manner shown and described.

JOSEPH T. MARTIN.

Witnesses:
JAMES T. GRAHAM,
JAMES H. HUNTER.